Nov. 19, 1957     J. MULLER     2,813,632
DEVICE FOR PREVENTING THE DEFORMATION OF
PLATES OF FILTER MATERIAL IN FILTERS
Filed Aug. 10, 1954     2 Sheets-Sheet 1

INVENTOR
JACQUES MULLER

BY *Young, Emery & Thompson*

ATTORNEYS

Nov. 19, 1957  J. MULLER  2,813,632
DEVICE FOR PREVENTING THE DEFORMATION OF
PLATES OF FILTER MATERIAL IN FILTERS
Filed Aug. 10, 1954  2 Sheets-Sheet 2

INVENTOR
JACQUES MULLER

BY Young, Emery & Thompson

ATTORNEYS

United States Patent Office 2,813,632
Patented Nov. 19, 1957

2,813,632

DEVICE FOR PREVENTING THE DEFORMATION OF PLATES OF FILTER MATERIAL IN FILTERS

Jacques Muller, La Garenne-Colombes, France

Application August 10, 1954, Serial No. 448,980

Claims priority, application France October 2, 1953

2 Claims. (Cl. 210—486)

The present invention relates to filters, for gaseous or liquid materials, comprising rigid plates or discs with flexible edges, clamping plates or discs of round, quadrangular or other suitable shape, which members are stacked in such a manner as to form between them, compartments divided into two filter chambers by means of a disc of filter material tensioned and clamped at its outer and inner edges between the outer and inner peripheral portions of two consecutive plates.

The invention relates particularly but not exclusively to filters of the aforesaid kind having plates which may be slightly coned so that the mere superposition of the plates forms intervening compartments for receiving discs of filter material. The rigid or folded edges of the clamping plates or discs are provided with openings or channels for the flow of fluid to be filtered and filtered fluid and the filter discs clamped between the plates are freely stretched to extend through the compartments to divide them into two chambers.

Filters of the type in question have a serious disadvantage due to the fact that the filter discs are subjected to the action of a differential pressure by the fluid because they offer a certain amount of resistance to the flow of the fluid from the inlet chamber to the discharge chamber. The filter discs which are of comparatively low mechanical strength are thereby distended in course of time and will finally bear against the plate defining the discharge chamber, over a considerable part of its area, which greatly reduces the flow, and moreover certain parts of the filter discs may fail under the pressure of the fluid to be filtered and become perforated so that some of the fluid will pass through the discs without being filtered.

None of the solutions for this problem heretofore proposed has given entire satisfaction, and the object of the present invention is to provide a device for filters of the aforesaid kind which will radically prevent the said deformation of the filter discs and will also completely eliminate the disadvantages resulting from accidental perforation of these discs.

In principle, the invention consists in locating in the discharge chamber of each compartment between the consecutive plates a grill with cells in the form of conical hollow protuberances each having a large base surface and a reduced small flow orifice at the apex which will become plugged up by fibers or fragments resulting from accidental perforation of the filter disc. The filter disc is stretched over the said grill which is constructed to provide a multiplicity of points of support over its entire area and to allow the filter fluid to pass towards the small flow orifices. This grill thus prevents the filter disc from becoming deformed under the action of the pressure of the fluid being filtered and entering the inlet chamber so that the said disc will no longer be forced against a wall which would prevent the filtering action and flow. Furthermore, the risk of perforation of the disc is reduced or eliminated, and the formation of the grill is also such as to annul the injurious effects which might result from perforation.

For greater clearness, there will now be described several constructional forms embodying the present invention which are illustrated in the accompanying drawings in which.

Figure 1:
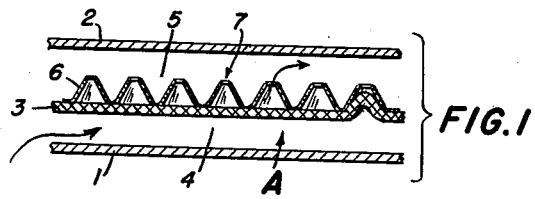
Figure 1 is a diagrammatic sectional view showing the principles of the invention.

In Figure 1 of the drawings, rigid plates 1 and 2 are superposed and held spaced from each other by any suitable means and between these plates there is tensioned a clamped disc 3 of filtering material, for example, pasteboard which divides the compartment between the plates into two chambers 4 and 5.

Figure 2:
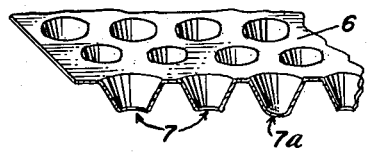
Figure 2 is a fragmentary perspective view of one construction of the grill with cells in the form of hollow conical protuberances.

It is assumed that the fluid to be filtered enters chamber 4, hereinafter referred to as the inlet chamber, and that the filtered fluid is discharged through the chamber 5, hereinafter termed the discharge chamber, after having traversed the disc 3 of filter material. If the disc 3 were freely stretched between the plates 1 and 2, the fluid circulating under a certain pressure and the filter disc offering a certain resistance thereto, there will be a tendency to force the disc in the direction of the arrow A and this disc would yield and, finally, would bear against the plate 2 defining the discharge chamber 5. The portions of the disc bearing against the plate 2 would thus be lost to the filtering action and would even offer resistance to the flow of fluid. To prevent the filter disc yielding in this manner, the invention consists in placing in the discharge chamber a grill 6, the preferred form of which is more clearly illustrated in Figure 2. The grill may be, for example, in the form of an annular metallic disc, punched or embossed in such a manner as to provide on one face a multiplicity of small cells in the form of conical protuberances 7 having the same dimensions. Most of the conical protuberances are truncated and perforated at the apices but a few of them, designated 7a, uniformly distributed over the disc, are neither truncated nor perforated, and are therefore of greater height than the first-mentioned protuberances. The purpose of the higher non-perforated conical protuberances will be hereinafter described.

It will be seen in Figure 1 that the grill is disposed in the discharge chamber 5 in such a manner that the cones project into the chamber 5 while the opposite face of the grill is in contact with the disc 3 of filter material and serves as a support for the same. Since the cones are relatively closely spaced and arranged in rows or any other appropriate manner, their bases are connected by narrow webs which effectively form a grill of honeycomb or other structure and provides a multiplicity of points or support for the filter disc when the latter is pushed by the pressure of the fluid to be filtered. After having traversed the filter disc, the fluid is received by the conical protuberances and passes through the orifices at their apices into the discharge chamber 5. Obviously, the apices of the cone have to be held at a certain distance away from the plate 2 notwithstanding the thrust exerted by the fluid to be filtered on the filter disc and, of course, on the grill. It is for this purpose that the non-perforated cones 7a are provided and they bear against the plate 2. Since the cones 7a are of greater height than the cones 7, this difference in height will insure a perfect spacing of the perforated cones 7 and, consequently, will provide free passage for the filtered fluid.

It will be understood that the webs of the grill against which the filter disc bears will involve a proportional loss of effective filtering surface. However, tests have shown that there is actually a practically negligible difference in effective filtering area between a filter disc bearing against such a grill and a filter disc freely tensioned. This unexpected result can perhaps be explained by the probable fact that the fluid to be filtered after penetrating the filter disc over its entire area will flow transversely on the web portions of the grill.

Should it happen that, due to an excess of pressure or any other reason, the pasteboard of the filter disc should be dislocated opposite one of the conical protuberances provided with an orifice, the fibers entrained by the fluid will collect in the bottom or apex of the cone and will obstruct its flow orifices so that there will be no effective perforation of the grill at that point and no direct flow passage for the fluid into the discharge chamber.

Figure 3:
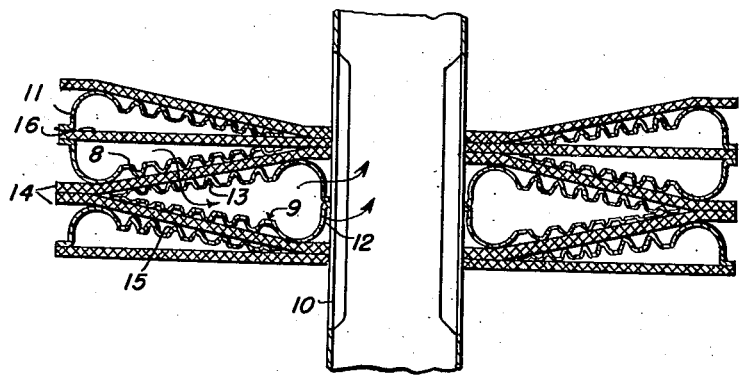
Figure 3 is an axial sectional view of a filter block or cartridge formed by superposed pairs of plates and opposed discs supported by grills according to the invention.

In the construction of a filter block or cartridge such as shown partly in axial section in Figure 3, there are used clamping plates 8 and 9 with honey-comb cells in the shape of conical protuberances forming a grill and having elastic flanged edges adapted to provide a firm and uniform gripping of the filter discs 14 and 16, which discs are stacked on a central tube 10 having longitudinal slots and clamped together by means of a nut (not shown) screwed on this tube. The elastic and perforated flanges 11 of the grill plates 8 are provided at the external circumference and on the concave face, while the elastic and perforated flanges 12 of the grill plates 9 are provided on the inner circumference and on the convex face. To assemble the elements, two opposed grill plates 9 are assembled so that concave faces are opposed.

There is applied on the external surface of each grill plate at 13 an annular filter disc 14. The two filter discs are of such size that their inner edges rest on the flanges 12 of the plates 9 while their outer edges contact each other in the manner shown in Figure 3. Finally, there is applied on the external surface of each filter disc the concave surface of a plate 8 in the form of an annular grill 15. The flanges 11 of the two opposed plates 8 bear on the outer edges of the filter disc 14. Several elements thus constructed are stacked on the tube 10 with the insertion between consecutive elements of discs 16 of filter material adapted to serve as gaskets between two consecutive plates 8 and prevent them from touching each other directly, and also to prevent the filter fluid from passing directly into the tube 10.

The fluid to be filtered arriving, for example, from the exterior, penetrates through the orifices in the flanges 11 into the inlet chamber and passes through the conical protuberances of the grill 15, forming in this case a second grill, then it traverses the filter discs 14, flows through the cones of the grills 13 into the discharge chamber and finally passes through the orifices of the flanges 12 into the central tube 10.

Figure 4:
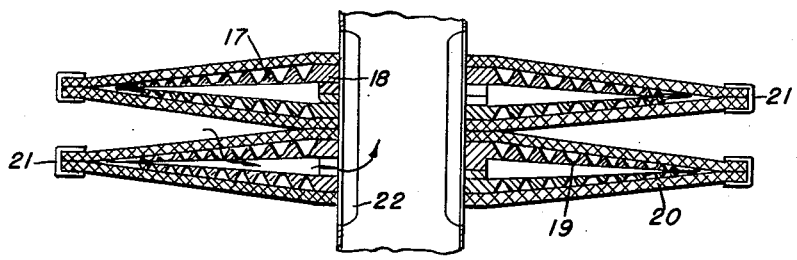
Figure 4 is an axial sectional view of a filter cartridge constituted by a stack of elements consisting respectively of two opposed grills on which filtering discs are stretched.

The filter cartridge in Figure 4 is of similar arrangement. Two opposed conical grill plates 17 are put together. The inner peripheral edge of each plate is provided with an axial flange 18 notched to provide passages for flow of fluid. The outer peripheral edges of the two plates are smooth and directly engage each other. There is placed on the exterior surface of the honey-comb grill 19 an annular filter disc 20. The two filter discs are of such size that their inner edges rest on the edges of the rims or flanges 18 of the grills while the outer edges of the two discs touch each other directly, as indicated in Figure 4. The outer edges of the discs 20 are sealed together in any suitable manner, for example, by means of a band 21 which is bent radially inwardly in such a manner that it embraces the edge of the element thus constituted and maintains by clamping, the assembly of filter discs and grill plates. A number of such elements are stacked and clamped, in known manner on a central tube 22 having longitudinal slots, so that the consecutive elements are in mutual contact at the inner circumferential edges of the filter discs, in fluid-type manner.

Figure 5:
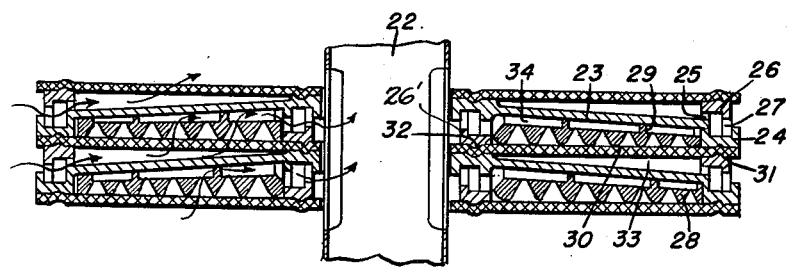
Figure 5 is an axial sectional view of several elements of a filter block or cartridge comprising molded plates of plastic material.

Figure 5 shows the construction of a molded plastic plate. It comprises a slightly conical disc 23 having on its exterior circumference and on its convex face a gutter 24 of rectangular section provided with channels 25 on its inner edge. In this gutter there is fitted a ring 26 of angle cross section, the outer vertical web of which is formed with channels 27 and the upper horizontal web of which bears against the edge provided with channels 25. The gutter and the ring thus form together a sort of an apertured flange through which the fluid can flow. The interior circumference of the disc 23 is provided with a flange similarly constructed, but formed on the concave face of the disc to form an inner gutter. In this gutter is fitted a ring 26' similar to ring 26. An annular honey-comb grill 28 of plastic material is fitted in the cavity of the concave surface formed by the outer gutter and the channeled portion of the inner gutter. This grill has conical holes, the small orifices in the apices of which are adjacent the concave surface of the plate 23 and are held at a certain distance therefrom by small molded bosses 29.

A filter disc 30 is applied against the grill 28 on the bottom of the outer gutter 24 in the interior face of the bottom of which there is formed a peripheral groove 31 and on the ring 26' of the inner gutter which has on its exterior surface a rib 32 disposed opposite the groove 31 in the upper surface of the bottom of the inner gutter. When the elements are clamped axially together to form a filter cartridge having elements of the kind described, the inner and outer edges of the filter disc are pressed by the ribs 32 into grooves 31 so that they are firmly maintained in place.

The fluid to be filtered arriving, for example, from the exterior, flows through the channels 27, 25 into the inlet chamber 33, passes through the filter discs 30, through the conical holes of the grill 28 into the discharge chamber 34 and finally flows through the channels in the inner gutter and ring into the central tube 22.

Figure 6:
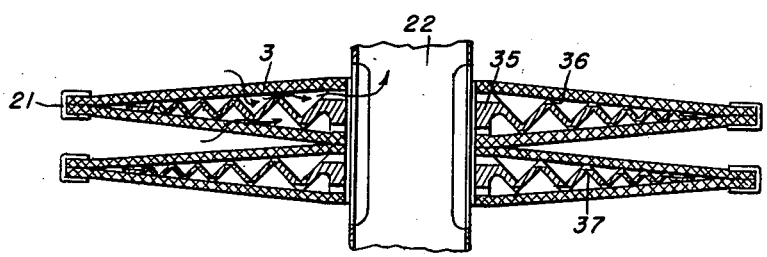
Figure 6 is an axial sectional view of elements of a filter block or cartridge comprising grills of molded material with radial conical-like cells on both faces.
Figure 7:
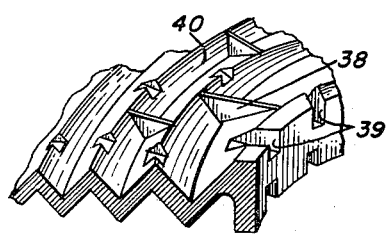
Figure 7 is a fragmentary perspective view of the double-faced grill according to Figure 6.

Another form of honeycomb cell grill is shown in Figures 6 and 7 in which plates 35 have both their faces provided with honeycomb cells in the form of waves 36 and 37 of diminishing depth. The hollow of each wave is divided by partitions 38 into a certain number of cells. The tops of the waves are formed with slots 39 of limited width and depth so as to obtain the same flow restriction result with the said slots, for liquid flowing from the somewhat conical cells formed by dividing each wave hollow 40 by partitions 38 as explained in connection with Figure 1. In the present case, the circulation of the fluid is effected in the direction of the arrows. The assemblage of the members to form a filter cartridge is carried out in the same way as described in connection with Figure 4.

The various embodiments hereinbefore described are intended only as examples and not by way of limitation, and various modifications are possible without exceeding the scope of the invention. In particular, the edges of the flanges can be formed so as to receive any suitable kind of joint.

Having described my invention, I claim:

1. A filter for fluids comprising a rigid plate of sheet material and a sheet of filter material applied on the front face of the plate, said plate being embossed to have on the back face a plurality of conical and hollow bosses with large openings on the front face facing the filter sheet, these large openings being very closely spaced and arranged in a quincuncial manner so as to form a grid with very narrow edges bearing the filter sheet, some of the bosses having at the top small openings which are reduced and adapted to be clogged by fragments of the filter sheet torn from this sheet by the filtered fluid, the remaining conical bosses being imperforate at the top and being higher than the perforated bosses.

2. A filter for fluids comprising a rigid plate of sheet material and a sheet of filter material applied on the front face of the plate, said plate being embossed to have on the back face a plurality of conical and hollow bosses with large openings on the front face facing the filter sheet and small openings at the top, these large openings being very closely spaced and having their bases connected by narrow webs which webs comprise a multiplicity of points of support for the filter sheet, said sheet bearing against said plate, and said small openings being reduced in size so that fragments of the filter sheet when torn from said sheet by the filtered fluid clog said openings and form plugs which continue the filtering action through them and prevent the carrying away of said fragments with the filtered fluid.

References Cited in the file of this patent

UNITED STATES PATENTS

| | | |
|---|---|---|
| 612,105 | Hendrick | Oct. 11, 1898 |
| 893,070 | Gobbi | July 14, 1908 |
| 1,758,284 | Gronning | May 13, 1930 |
| 2,147,792 | Knight | Feb. 21, 1939 |
| 2,536,690 | Miller | Jan. 2, 1951 |
| 2,592,527 | Armstrong | Apr. 15, 1952 |
| 2,592,528 | Failmezger | Apr. 15, 1952 |
| 2,597,235 | Ericson | May 20, 1952 |
| 2,601,521 | Heftler | June 24, 1952 |
| 2,658,624 | Redner | Nov. 10, 1953 |
| 2,675,920 | Muller | Apr. 20, 1954 |

FOREIGN PATENTS

| | | |
|---|---|---|
| 98,389 | Germany | July 25, 1898 |
| 273,215 | Germany | Dec. 17, 1912 |
| 526,363 | Germany | Mar. 21, 1929 |
| 693,349 | Germany | June 13, 1940 |
| 726,783 | Germany | Sept. 10, 1942 |
| 888,481 | Germany | July 23, 1953 |
| 4,818 | Great Britain | Apr. 4, 1896 |
| 489,860 | Great Britain | Aug. 4, 1938 |
| 403,107 | France | Sept. 16, 1909 |
| 177,293 | Austria | Jan. 11, 1954 |